US007560041B2

(12) United States Patent
Yoon

(10) Patent No.: US 7,560,041 B2
(45) Date of Patent: Jul. 14, 2009

(54) COMPOSITION FOR ACTION OF RESIST-FIRE AND FIRE-EXTINGUISHING

(76) Inventor: Wook Yeal Yoon, 213-602 Hyundai-apt., #611, Kuni-dong, Gwangjin-gu, Seoul 143-200 (KR)

( * ) Notice: Subject to any disclaimer, the term of this patent is extended or adjusted under 35 U.S.C. 154(b) by 602 days.

(21) Appl. No.: 10/581,063

(22) PCT Filed: Nov. 24, 2004

(86) PCT No.: PCT/KR2004/003038

§ 371 (c)(1),
(2), (4) Date: May 30, 2006

(87) PCT Pub. No.: WO2005/051491

PCT Pub. Date: Jun. 9, 2005

(65) Prior Publication Data

US 2007/0090322 A1 Apr. 26, 2007

(30) Foreign Application Priority Data

Nov. 28, 2003 (KR) ...................... 10-2003-0085463
Oct. 11, 2004 (KR) ...................... 10-2004-0081048

(51) Int. Cl.
*A62D 1/00* (2006.01)
*A62D 1/02* (2006.01)
*A62D 1/04* (2006.01)
*C09K 21/02* (2006.01)
*C09K 21/04* (2006.01)
*C09K 21/12* (2006.01)

(52) U.S. Cl. .............................. 252/2; 252/3; 252/8.05; 252/603; 252/606; 252/607; 252/608; 252/610; 252/611

(58) Field of Classification Search ..................... 252/2, 252/8.05, 606, 610
See application file for complete search history.

(56) References Cited

U.S. PATENT DOCUMENTS

| | | | | |
|---|---|---|---|---|
| 2,386,471 | A * | 10/1945 | Grinnell et al. | 106/18.15 |
| 4,001,126 | A * | 1/1977 | Marion et al. | 252/62 |
| 4,374,171 | A | 2/1983 | McCarter | |
| 5,156,890 | A * | 10/1992 | Rock | 427/240 |
| 5,466,386 | A * | 11/1995 | Stewart et al. | 252/2 |
| 5,534,301 | A * | 7/1996 | Shutt | 427/377 |
| 5,833,874 | A | 11/1998 | Stewart et al. | |
| 6,319,431 | B1 * | 11/2001 | Basson et al. | 252/607 |
| 7,211,193 | B2 * | 5/2007 | Inada et al. | 210/634 |
| 2004/0121114 | A1 * | 6/2004 | Piana et al. | 428/85 |

FOREIGN PATENT DOCUMENTS

| | | | |
|---|---|---|---|
| KR | 96-014332 | B1 | 10/1996 |
| KR | 1997-0003481 | B1 | 3/1997 |
| KR | 2001-0110512 | A | 12/2001 |
| KR | 2003-0018038 | A | 3/2003 |
| KR | 2003-0058838 | A | 7/2003 |
| KR | 2003-0062707 | A | 7/2003 |

* cited by examiner

*Primary Examiner*—Joseph D Anthony
(74) *Attorney, Agent, or Firm*—Sughrue Mion, PLLC

(57) ABSTRACT

The present invention relates to a composition for fire-resisting and fire-extinguishing with pro-environmental characteristic. More particularly, the present invention relates to the composition comprising monobasic sodium phosphate, dibasic ammonium phosphate, borax, boric acid, olyoxyalkylated alkyl phosphoric acid ester and water.

2 Claims, 1 Drawing Sheet

<Fig. 1>
<Fig. 2>

COMPOSITION FOR ACTION OF RESIST-FIRE AND FIRE-EXTINGUISHING

TECHNICAL FIELD

The present invention relates to a composition for fire-resisting and fire-extinguishing in harmony with environment. In particular, the present invention relates to the composition comprising monobasic sodium phosphate, dibasic ammonium phosphate, borax, boric acid, polyoxyalkylated alkyl phosphoric acid ester and water.

BACKGROUND ART

Comparing an amount of electricity and fire used in everyday life, living space, large downtown area, factories and licensed stores are distributed densely and built as closed-cells so that danger of fire is increased. Consequently, most fire may cause a conflagration such as a subway fire accident, a forest fire, etc. To prevent the conflagration, it is important to suppress the fire at an early stage.

However, compositions for fire-extinguishing, used recently are poor at fire-resisting and weakened at a heat. Since another reaction is generated, re-firing is easily induced due to exhausting function of fire-resisting. Further, the compositions contain a plenty of harmful ingredients such that it is exceedingly noxious for human body when inhaled.

Therefore compositions for fire-resisting and fire-extinguishing, which are capable of preventing fire from running farther, and re-firing, etc., are essential. Also, the compositions have functions of pro-environment, heat-resisting, etc.

A conventional composition for fire-extinguishing comprises hydrocarbon containing bromine such as bromotrifluoromethane, although the conventional composition comprises harmless materials to human body, forms no residue after fire-extinguishing and has a predominant function of fire-extinguishing, the conventional composition is expected to be prohibited due to being identified as a material that is harmful to the earth's protective ozone layer.

Meanwhile, a composition for fire-extinguishing, as an substitute, comprises at least one selected from the group of nitrogen, argon and dioxide carbon, trifluoromethane, chlorodifluoromethane, etc. The composition comprising nitrogen only needs plenty of nitrogen and a wide storage house due to storing as compressed-gas form. Compositions in groups of HCFC and HFC for fire-extinguishing cause environmental problems such as destruction of ozone layer, global worming, etc. Compositions comprising dioxide-carbon for fire-extinguishing are inexpensive and do not need a wide storage house except for a higher temperature of fire-extinguishing compared to others.

In Korea Laid-open publication number 1996-14332 and 1997-3481, conventional compositions comprising ammonium sulfate, urea, tribasic sodium phosphate, soda ash, sodium carbonate, bicarbonate of soda, etc. for fire-extinguishing are disclosed. In Korea Laid-open publication number 2003-58838, a composition comprising ammonium sulfate and urea, as a pro-environmental liquid composition, is disclosed.

The above-mentioned compositions are, however, used for fire-extinguishing after outbreak of fire, and have a poor function of fire-resisting. Further, re-firing is generated due to exhaustion of fire-extinguishing function and fire-suppressing function over time.

In Korea Laid-open publication number 2001-110512, a composition comprising dicyandiamide resin borax and methanol is disclosed. The composition is, however, used only as a resistance lacking a fire-extinguishing efficiency after occurrence of fire.

A method of preparing an inorganic paint and glue resisting fires annexed boric acid, borax and optional coloring matter to ceramic binder containing silicic acid is disclosed in Korea Laid-open publication number 2003-18038. The inorganic paint and glue are effective of fire-resisting by spraying onto an exterior or an adhesive surface of wallpaper. The paint and glue are dangerless due to an aqueous composition comprising water as a solvent and pro-environmental due to odorless. But the paint and glue may not be used for fire-extinguishing after outbreak of fire.

Although various resistance compositions for fire-extinguishing have been developed, the compositions do not have functions of fire-resisting and fire-extinguishing at the same time.

Accordingly, the composition having functions of fire-resisting and fire-extinguishing at the same time needs to be developed to suppress fire effectively without spreading of fire and re-firing by origin of fire.

According to many experimentations, the present inventors have found that a composition comprising monobasic sodium phosphate, dibasic ammonium phosphate, borax, boric acid, polyoxyalkylated alkyl phosphoric acid ester and water has excellent efficiencies of resisting fire and suppressing fire rapidly, and outstanding heat-resisting property, pro-environment characteristic, etc.

DISCLOSURE OF THE INVENTION

Technical Problem

The present invention provides a composition for fire-resisting without reacting at a high temperature and for fire-extinguishing without re-fire and harm to human body.

Technical Solution

To accomplish the above-mentioned object, the present invention provides a composition for fire-resisting and fire-extinguishing comprising monobasic sodium phosphate, dibasic ammonium phosphate, borax, boric acid, polyoxyalkylated alkyl phosphoric acid ester and water.

The composition for fire-resisting and fire-extinguishing may have following conditions.

The composition has properties of fire-resisting and fire-extinguishing at the same time to prevent re-fire induced by origin of fire.

The composition has heat-resisting property to resist fire at a high temperature.

The composition comprises substances without harm to human and pro-environment.

The composition used as a state of liquid exists in homogeneous state at a normal temperature without precipitate.

Therefore, the present invention comprises boric acid and borax to prepare the composition that has excellent efficiencies of fire-inhibiting and heat-resisting.

The present invention comprises monobasic sodium phosphate and dibasic ammonium phosphate to prepare the composition having a predominant effect on fire-extinguishing.

The present invention comprises polyoxyalkylated alkyl phosphoric acid ester to prepare the composition that exists in homogeneous state at a normal temperature without precipitate.

Hereinafter, the present invention is described in detail.

A fire resistant composition prevents burning of objects. The fire resistant composition is classified into oil and water according to nature of the composition. According to a method of fire-resisting, methods of preventing spread of fire by dropping firing point through intercepting heat and cooling, by cutting off oxygen, and by intercepting oxygen and heat are used. The composition for fire-resisting and fire-extinguishing according to the present invention is water-solubility and is prepared by the method of preventing spread of fire through intercepting oxygen and heat.

The composition of the present invention comprises monobasic sodium phosphate, dibasic ammonium phosphate, borax, boric acid, polyoxyalkylated alkyl phosphoric acid ester and water such that the composition has a hydrogen functional group and absorbs an oxygen functional group when the composition is heated. The hydrogen functional group reacts with the oxygen functional group to become water. Further, the composition contacts with a deliquescent material and reacts to ammonium and sodium remained in painted objects so that the composition interrupts a supply of oxygen necessary to catch fire.

Features of ingredients in the composition for fire-resisting and fire-extinguishing according to the present invention are shown as below.

Monobasic sodium phosphate($NaH_2PO_4 \cdot 2H_2O$), used for a cleaner of boiler and penicillin culture, is boiled at a temperature of above about 100° C. to form meta sodium phosphate($NaH_2PO_4$) due to evaporating water molecule with heat.

Dibasic ammonium phosphate($(NH_4)_2HPO_4$) is used for a dye-dispersing agent, porcelain enamel, a fire retardant paint, yeast culture, etc. When dibasic ammonium phosphate is heated at a temperature of above about 155° C., ammonia gas($NH_3$) is released to form ammonium hydrogenphosphate ($NH_4H2PO_4$). Ammonium hydrogenphosphate is decomposed at a temperature of about 240° C. to produce sodium dimeta phosphate($(NaPO_3)2H_2O$ and lose heat without reacting to oxygen.

Therefore, monobasic sodium phosphate and dibasic ammonium phosphate may have properties of losing heat and temperature decrease in suppression of fire. A composition including ammonium sulfate instead of ammonium phosphate is effective of early fire-resisting and fire-extinguishing, however, over time, color of the painted objects is changed and ammonium sulfate reacts to carbon dioxide in an air to generate sulfinurization.

Borax($Na_2B_4O_7 \cdot 10H_2O$) is used for glass, ceramic ware, an antiseptic, medicine, cosmetic etc. Borax begins to decompose at a temperature of about 150° C. and evaporates water at a temperature of about 320° C. to become hyaline, and melts at a temperature of about 741° C. The borax has excellent efficiencies of resisting heat and interrupting flows of heat and oxygen.

Boric acid($H_3BO_3$) is used for a corrosion-resisting, eye-water, ceramic ware glaze, an artificial jewel, cosmetic, etc. Boric acid loses water molecule at a temperature of about 120° C. and forms tetra boric acid to be converted into hyaline at a temperature of above about 160° C. to bear at a high temperature and interrupt flows of heat and oxygen.

Accordingly, borax and boric acid are able to raise heat-resisting property of the composition of the present invention and interrupt flows heat and oxygen effectively such that the composition has an excellent efficiency of resisting fire at a high temperature.

Since borax and boric acid have a low degree of solubility in water when liquid compositions comprising borax and boric acid is prepared and stored, efficiencies of fire-resisting and fire-extinguishing are lowered due to forming precipitate. The solubilities of borax and boric acid increase at a high temperature such that the liquid compositions have been prepared by dissolving borax and boric acid at a high temperature. However, the precipitate is still formed due to storing the liquid composition at a normal temperature.

Further, when liquid composition comprising monobasic sodium phosphate, dibasic ammonium phosphate, borax and boric acid prepared, watersoluble mineral reacts to boron compound to form precipitate and prepare the liquid compositions of inhomogenity.

To solve the above-mentioned problems, the present invention provides the composition for fire-resisting and fire-extinguishing, further comprising polyoxyalkylated alkyl phosphoric acid ester as well as monobasic sodium phosphate, dibasic ammonium phosphate, borax and boric acid.

Polyoxyalkylated alkyl phosphoric acid ester belongs to non-ionic surfactant.

Polyoxyalkylated alkyl phosphoric acid ester raises the solubilities of boric acid and borax to prevent precipitate that is formed by low solubilities of boric acid and borax at a normal temperature and by reacting of boric acid, borax, monobasic sodium phosphate, and dibasic ammonium phosphate. Further, hydrophobic film, induced using polyoxyalkylated alkyl phosphoric acid ester, prevents another reaction, color change and permeation into the composition.

The composition of the present invention is prepared by mixing monobasic sodium phosphate, dibasic ammonium phosphate, borax, boric acid and polyoxyalkylated alkyl phosphoric acid ester and stirring, and then adding water and stirring.

The composition may be mixed at various ratios. Preferably, the composition comprising monobasic sodium phosphate, dibasic ammonium phosphate, borax, boric acid, and water is mixed in ratio about 1: about 1~5: about 0.3~1.5: about 0.3~1.5: about 0.3~1.5: about 10~20 by weight, respectively, more preferably, in ratio about 1: about 3.76: about 0.6: about 0.8: about 0.6: about 13.24 by weight.

Water is used generally to prepare the composition for fire-extinguishing and preferably mixed to the composition in a ratio of about 50% by weight to effectively suppress fire, more preferably about 66.2% by weight.

The composition for fire-resisting and fire-extinguishing of the present invention may be used through diluting with water at a density of about 10% by weight in disaster such as a forest fire.

The composition of the present invention exhausts materials without carcinogen and harmful residue even in high temperature reaction of the composition. Further, the effects of the composition may be maintained semi-permanently without washing off the composition after using it such that the composition prevents re-firing during suppression of fire.

Advantageous Effects

A composition of the present invention has a heat-resisting property at a high temperature to maintain excellent effect of fire-resisting.

The composition has effects of fire-resisting and fire-extinguishing at the same time to effectively prevent re-firing during suppression of fire.

The composition discharges harmless substances to human body when the composition is painted on fabric or wallpaper as a fire resistant, and is sprayed for suppression of fire.

When the composition is prepared as liquid, the liquid composition may be stored for long time at a normal temperature without precipitation.

BRIEF DESCRIPTION OF THE DRAWING

FIG. 1 is a picture showing a situation of car firing.

FIG. 2 is a picture showing a situation of car firing suppression by using a composition for fire-resisting and fire-extinguishing according to the present invention.

BEST MODE FOR CARRYING OUT THE INVENTION

The examples are given solely for the purpose of illustration and are not to be construed as limitations of the present invention, as many variations thereof are possible without departing from the spirit and scope of the invention.

EXAMPLE 1

50 kg of monobasic sodium phosphate, 188 kg of dibasic ammonium phosphate, 30 kg of borax, 40 kg of boric acid and 30 kg of polyoxyalkylated alkyl phosphoric acid ester were mixed in orderly and stirred, and then added 662 kg of water to prepare 1000 kg of a liquid composition for fire-resisting and fire-extinguishing.

COMPARATIVE EXAMPLE 1

Preparation of a Composition without Comprising Borax and Boric Acid 50 kg of monobasic sodium phosphate, 188 kg of dibasic ammonium phosphate, 70 kg of ammonium sulfate and 30 kg of polyoxyalkylated alkyl phosphoric acid ester were mixed in orderly and stirred, and then added 662 kg of water and stirred to prepare 1000 kg of a liquid composition for fire-resisting and fire-extinguishing.

COMPARATIVE EXAMPLE 2

Preparation of a Composition without Comprising Polyoxyalklated Alkyl Phosphoric Acid Ester 50 kg of monobasic sodium phosphate, 188 kg of dibasic ammonium phosphate, 30 kg of borax and 40 kg of boric acid were mixed in orderly and stirred, and then added 692 kg of water to prepare a liquid composition for fire-resisting and fire-extinguishing.

EXPERIMENTAL EXAMPLE 1

Test of Heat-Resisting Property-Wallpaper

After painting each of the liquid compositions prepared by Example 1 and Comparative Example 1 on the wallpapers, which are 20 cm in width and 29 cm in length, the painted wallpapers were put into a pyrostat for 3 hours and then heat-resisting property was measured. The results were represented in Table 1.

TABLE 1

| | Wallpaper | |
|---|---|---|
| Temperature | Example 1 | Comparative example 1 |
| 150° C. | No transformation of exterior | Change into yellow |
| 250° C. | No transformation of exterior | Change into yellow |
| 350° C. | Change into yellow | Change into lemon yellow |
| 450° C. | Change into lemon yellow | Carbonized |
| 500° C. | Carbonized (A deposit in particular glass phase) | |

In the Table 1, the composition for fire-resisting and fire-extinguishing prepared by the example 1 had excellent heat-resisting property. On the other hand, the composition, prepared by the comparative example 1, comprising ammonium sulfate instead of borax and boric acid had a low degree of heat-resisting property and generated sulfuration that color of surface changed into yellow.

Since the composition for fire-resisting and fire-extinguishing comprised borax and boric acid, heat-resisting property might be increased.

EXPERIMENTAL EXAMPLE 2

Test of Solubility and Stabilization

Into a pyrostat were placed the five sampling bottles of 500 ml filled with the compositions prepared by the example 1 and the comparative example 2, respectively. Then, solubility and stabilization of the compositions in the pyrostat for 48 hours were measured at temperatures of 10° C., 20° C., 30° C. and 40° C. The results were shown in Table 2.

TABLE 2

| | Temperature | External | A deposit | Color |
|---|---|---|---|---|
| Example 1 | 10° C. | Clear | No | Same |
| | 20° C. | Clear | No | Same |
| | 40° C. | Clear | No | Same |
| Comparative Example 2 | 10° C. | Thick | Yes | Same |
| | 20° C. | Thick | Yes | Change |
| | 40° C. | Clear | Yes | Change into lemon yellow |

In Table 2, the composition for fire-resisting and fire-extinguishing, which was produced by the example 1, was clear and having no precipitate. However the composition prepared by the comparative example 2 was thick and having precipitate.

Therefore, the composition for fire-resisting and fire-extinguishing, comprising polyoxyalkylated alkyl phosphoric acid ester, might be prepared as a state of homogeneous liquid without the precipitate.

EXPERIMENTAL EXAMPLE 3

Test of Fire-Extinguishing in Case of Ordinary Fire

Into an ironic angle of combustion which is 90 cm in width, 90 cm in length and 4 cm in height was poured 1.5 l of gasoline. And then 144 rectangular lumbers with 35 ml of dried pine tree and black alder were piled up in a lattice on the ironic angel. After firing, the fire was put out in 3 minutes using fire extinguishers. The fire extinguishers contained the composition prepared by the example 1 and only water (filled with 3 l of liquid, 8 kg/cm$^2$ of compressed gas) respectively, the results were compared. The test was conducted 3 times and average time was calculated and represented in Table 3.

TABLE 3

| Filled liquid | The time of fire-extinguishing |
|---|---|
| Example 1 | 8 seconds |
| 100% of water | 108 seconds |

In Table 3, fire was suppressed in 8 seconds using the fire extinguisher filled with the composition produced by the example 1, whereas it took 10 times longer than the time of putting out using the above-mentioned fire extinguisher when suppressed using the fire extinguisher filled with only water. Accordingly, the composition of the present invention might suppress fire rapidly, thereby reducing time of fire-extinguishing.

EXPERIMENTAL EXAMPLE 4

Test of Fire-Extinguishing—Oil Fire

Into an iron box, which was 44.7 cm in width, 44.7 cm in length and 30 cm in height, was filled with water up to 12 cm by height of the box and then-poured 3 cm of gasoline. After firing, the fire was put out in 1 minute using fire extinguishers. The fire extinguishers including the composition prepared by the example 1 and only water (filled with 3 l of liquid, 8 $kg/cm^2$ of compressed gas) respectively, and time of suppression of fire was measured and compared. The test was carried out 3 times and average time was calculated as shown in Table 4.

TABLE 4

| Filled liquid | Elapsed time |
|---|---|
| Example 1 | 15 seconds |
| 100% of water | 420 seconds |

In Table 4, fire was suppressed in 15 seconds using the composition produced by the example 1, whereas it took 30 times longer than the time of putting out fire using the above-mentioned fire extinguisher when suppressed using the fire extinguisher filled with only water.

Therefore, the composition of the present invention might suppress fire rapidly, thereby shortening the time of extinguishing fire.

EXPERIMENTAL EXAMPLE 5

Test of Fire-Resisting—Wallpaper

Capacity of fire-resisting was measured on the compositions prepared by the example 1 to a wallpaper through request to the Official house of Korea Firefighting Examination by standards of function of fire-resisting (KOFEIS1001). The results were shown as below in Table 5.

TABLE 5

| | | Example 1 | | |
|---|---|---|---|---|
| | A standard | 1 | 2 | 3 |
| After frame time | Within 3 sec. | 0.0 sec. | 0.0 sec. | 0.0 sec. |
| After glow time | Within 5 sec. | 0.0 sec. | 0.0 sec. | 0.0 sec. |

TABLE 5-continued

| | | Example 1 | | |
|---|---|---|---|---|
| | A standard | 1 | 2 | 3 |
| Carbonized area | Within 30 $cm^2$ | 15.7 $cm^2$ | 20.5 $cm^2$ | 17.7 $cm^2$ |
| Carbonized length | Within 20 cm | 6.2 cm | 6.5 cm | 6.0 cm |

In the Table 5, the composition of the present invention was proper to spray on the wallpaper according to the standards of function of fire-resisting capacity. Accordingly, the composition for fire-resisting and fire-extinguishing might have an excellent efficiency of resisting fire.

EXPERIMENTAL EXAMPLE 6

Test of Fire-Resisting—Fabric

Capacity of fire-resisting was measured on the compositions prepared by the example 1 to a fabric through request to the Official house of Korea Firefighting Examination by standards of function of fire-resisting (KOFEIS1001). The results were shown as below in Table 6.

TABLE 6

| | | Example 1 | | |
|---|---|---|---|---|
| | A standard | 1 | 2 | 3 |
| After frame time | Within 3 sec. | 0.0 seconds | 0.0 seconds | 0.0 seconds |
| After glow time | Within 5 sec. | 0.0 seconds | 0.0 seconds | 0.0 seconds |
| Carbonized area | Within 30 $cm^2$ | 21.2 $cm^2$ | 21.0 $cm^2$ | 20.5 $cm^2$ |
| Carbonized length | Within 20 cm | 6.9 cm | 7.0 cm | 6.3 cm |

The composition of the present invention was proper to spray on the fabric according to the standards of function of fire-resisting. Thus, the composition for fire-resisting and fire-extinguishing, prepared by the present invention might have excellent efficiency of resisting fire.

EXPERIMENTAL EXAMPLE 7

Test of Toxicity 1

To certify detection of substance with harm to human body in spraying the composition to suppress fire or in painting on a fabric or wallpaper, requested to Korea testing and research institute for chemical industry and analyzed ICP. As a result, cadmium(Cd), lead(Pb), copper(Cu), manganese(Mn), arsenic(As), mercury(Hg), zinc(Zn), tin(Sn) and chrome(Cr) were not detected at all and iron(Fe) was detected as little as amount of 2.8 or 3.1 mg/kg.

In accordance with the above results, the composition of the present invention for fire-resisting and fire-extinguishing had no toxicity.

EXPERIMENTAL EXAMPLE 8

Test of Toxicity 2

Car firing was suppressed car firing using the composition of present invention, and black dirt and poisonous gases were observed. Occurrence of fire and situation of suppressing fire were shown in both FIGS. 1 and 2.

Refer to FIG. 1, black dirt and poisonous gases were produced by car-firing. Referring to FIG. 2, fire was extinguished rapidly to generate white smoke containing carbon dioxide and vapor when the fire was suppressed using the composition of the present invention.

Therefore, the composition for fire-resisting and fire-extinguishing of the present invention was burned so quickly, thereby generating a little of black dirt and poisonous gas during fire suppression.

The invention claimed is:

1. A composition for fire-resisting and fire-extinguishing comprising monobasic sodium phosphate, dibasic ammonium phosphate, borax, boric acid, polyoxyalkylated alkyl phosphoric acid ester and water in a ratio of about 1: about 1~5: about 0.3~1.5: about 0.3~1.5: about 0.3~1.5: about 10~20 by weight, respectively.

2. The composition of claim 1, the ratio is about 1: about 3.76: about 0.6: about 0.8: about 0.6: about 13.24 by weight, respectively.

* * * * *